3,483,925
SQUEEZE TREATMENT OF PRODUCING
OIL WELLS
John V. Slyker, Midland, Tex., assignor to Calgon
Corporation, Pittsburgh, Pa.
No Drawing. Filed Feb. 6, 1968, Ser. No. 703,242
Int. Cl. E21b 43/22, 43/25
U.S. Cl. 166—279                                    10 Claims

ABSTRACT OF THE DISCLOSURE

A method is disclosed of treating producing oil wells to inhibit the deposition of scale in the formation which otherwise would retard the flow of oil toward the wellbore. The method comprises introducing into the formation both a viscous polymer solution and a solution of scale inhibitor. In the preferred method, three stages are used: an initial scale inhibitor stage, a polymer stage, and a second scale inhibitor stage.

BACKGROUND OF THE INVENTION

The term "squeeze treatment" has achieved widespread use among oil-field engineers. It means any treatment of an unfractured producing well performed by injecting a corrosion or scale inhibitor into the wellbore of the producing well to place the inhibitor into the formation. The inhibitor is placed far enough into the formation so that its desorbtion or other release will be gradual, thus keeping the pores and passages for the oil open and/or the equipment and piping free of corrosion.

Many times, however, in spite of care taken to be sure that the inhibitor is placed far into the reservoir and is presumably adsorbed in the prestructure of the formation, it is found that the inhibitor is completely desorbed and removed with the produced fluids in a relatively short time, leaving the well again unprotected. Also, it is apparent that in many cases the portions of the formation first occupied by the scale inhibitor are the first portions to be cleared of inhibitor after the well has been returned to production. These areas are probably the most permeable and the portions through which the largest quantities of material flow.

Saniford, in U.S. Patent 3,308,885, describes a method of treating producing wells in which a small amount of a water-soluble, partially hydrolyzed polyacrylamide is injected into the well, for the purpose of improving the oil to water ratio in the produced fluids. If scale deposition and corrosion are permitted to continue unchecked, however, any improvement will be short-lived.

SUMMARY OF THE INVENTION

I have invented a method of squeeze treating a well in which the above disadvantages are overcome and which provides a relatively even, gradual desorption and steady inhibitor treatment over a longer period of time.

In the preferred form of my invention, I provide a method of treating a subsurface oilfield formation penetrated by an oil producing well comprising (a) injecting into said well a solution of a scale-inhibiting composition, (b) thereafter injecting into said well a solution of a viscosity-increasing polymer, and (c) thereafter injecting into said well a further quantity of a solution of scale-inhibiting composition. This procedure may be followed by overflushing the well with a liquid in an amount sufficient to flush the inhibiting composition out of the well-bore and into the formation. Preferably the well is then permitted to remain undisturbed for a time, usually at least twenty-four hours but which may be only 1 or 2 hours, before beginning to pump again.

As the inhibitor, I may use any organic inhibitor known to have scale inhibiting properties. Preferably it will have a demonstrable ability to adsorb on the surface of the pore structure or other surface of the formation. The inhibitor should also be compatible with common oilfield brines—this is, it should not precipitate out of the brine or other fluid used to conduct it before the adsorption area is reached. Examples of organic scale inhibitors which are useful in my invention are organic phosphonates such as are disclosed in Ralston, U.S. Patent 3,336,221 and Blaser et al., U.S. Patent 3,214,454. My preferred compositions for scale inhibiting include not only the specific compounds disclosed in these two patents, but any organic phosphonate scale inhibitor. In particular, the organic phosphonate inhibitors I may use are either (a)

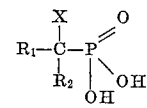

where $R_1$, is independently selected from the group consisting of H, alkyl groups up to four carbon atoms, phenyl, and phosphonic acid groups, $R_2$ is selected from the group consisting of hydrogen, alkyl groups having up to 4 carbon atoms and

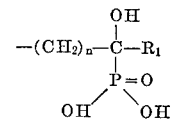

where $n$ is an integer from 0 to 8, and X is H or OH and water-soluble salts thereof, (b)

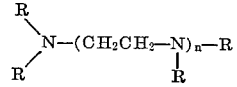

where R is independently selected from the group consisting of hydrogen and

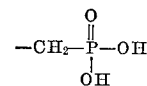

provided, however that at least half of the radicals represented by R are

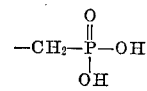

and $n$ is an integer from 0 to 14; and water-soluble salts thereof. The presently preferred compound of this group is the sodium salt of amino tris methylene phosphonate.

Organic phosphate esters are also known to be scale inhibitors. These may also be used in my invention.

As the viscosity-increasing polymer I may utilize any water-soluble polymer having a molecular weight between about 100,000 and about 10,000,000. The polymers of most interest herein are polymers essentially of acrylamide, having about 3% to about 45% of the amide groups hydrolyzed to the carboxylic acid form, and water-soluble copolymers of acrylamide and copolymerizable monomers in amounts up to about 50 percent by weight. Acrylic acid and diacetone acrylamide may be mentioned as suitable copolymerizable monomers. In any case, the acrylamide moiety is preferably hydrolyzed to the acid form to the extent of about 3% to about 45%. The presently preferred polymer is a homopolyacrylamide having a molecular weight between 100,000 and 10,000,000 which is hydrolyzed to the extent of 10% to 40% of the amide groups.

My invention is not restricted to the particular sequence of addition described above. In many cases, a sufficient prolongation of feedback will be achieved by a two-stage squeeze, e.g. where the polymer is first added and the phosphonate inhibitor follows. It is also advantageous to inject the inhibitor first, followed by the polymer, and in some cases it will be desirable to inject the inhibitor and polymer together. My invention includes all such variations.

It will be seen from the following examples that my invention achieves prolonged feedback.

Example I

In this squeeze procedure, a 5% solution of sodium amino tris methylene phosphonate was made in 25 barrels of fresh water and injected into the well, followed by a 0.2% solution of 35% hydrolyzed polyacrylamide in 25 barrels of fresh water. Another solution of the same phosphonate, this time in 50 barrels of fresh water in 2½% strength by weight was injected. This was overflushed with 100 barrels of brine plus a quantity equal to the volume of the annulus. The well was permitted to set for 48 hours before resuming production. Fluid production over a period of seven months indicates the concentration of inhibitor in the produced water is still sufficient adequately to inhibit scale formation.

Example II

A similar procedure was followed in this case except that in the second stage the polymer solution was about 0.25% by weight and the third stage inhibitor solution was 5%. Again, data collected up to five months later indicates that the inhibitor concentration will remain effective for at least a few more months.

Example III

Again a three-stage treatment was used. The first and third stage inhibitor solutions were about 15% strength, and the second stage polymer solution was about 0.1%.

Example IV

In this procedure, the first stage was 30 barrels of a 0.25 percent solution in brine of 35% hydrolyzed polyacrylamide, the second stage was 30 barrels of a 4% solution in brine of sodium amino tris phosphonate, and the third stage was again 30 barrels of a 0.25% solution in brine of the same polymer. This was overflushed with 300 barrels of oilfield brine, followed by 150 barrels of fresh water, and the well was shut down for 40 hours. Production data for the first few months indicates prolonged production will be achieved.

At least about 0.5% solutions of inhibitor should be used, and the polymer having a molecular weight of at least 100,000 should be used at a concentration of at least about 0.05% to achieve a useful viscosity. The total quantity used will vary according to the expected production, but generally about 10 pounds of inhibitor will be the minimum total, and at least about ten pounds of polymer (in the concentrations mentioned above) will be required to retain the inhibitor. The polymer should not be used in concentrations greater than about 2% by weight.

It is within the scope of my invention to add the inhibitor and the polymer in any sequence or at the same time. The solutions of polymer and inhibitor may be injected at any effective pressure less than fracturing pressure.

I do not intend to be limited to the above specific examples. My invention may be otherwise practiced within the scope of the following claims.

I claim:
1. Method of treating a subsurface oilfield formation penetrated by an oil producing well bore comprising (a) injecting into said formation through said well bore a solution of a water-soluble viscosity-increasing polymer, having a molecular weight between about 100,000 and 10,000,000 and (b) thereafter injecting into said formation through said well bore a solution of organic scale-inhibiting composition.

2. Method of claim 1 followed by overflushing with a liquid sufficient to flush the scale inhibiting composition out of the wellbore and into the formation.

3. Methods of claim 1 in which the scale inhibitor is an organic phosphonate.

4. Method of claim 3 in which the scale-inhibiting composition is a compound of the formula

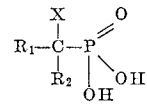

where $R_1$, is independently selected from the group consisting of H, alkyl groups up to four carbon atoms, phenyl, and phosphonic acid groups, $R_2$ is selected from the group consisting of hydrogen, alkyl groups having up to 4 carbon atoms and

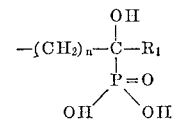

where $n$ is an integer from 0 to 8, and X is H or OH and water-soluble salts thereof.

5. Method of claim 3 in which the scale inhibiting composition is a compound of the formula

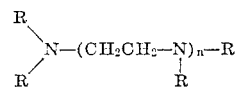

where R is independently selected from the group consisting of hydrogen and

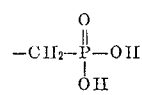

provided, however that at least half of the radicals represented by R are

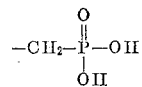

and $n$ is an integer from 0 to 14; and water-soluble salts thereof.

6. Method of claim 1 in which the viscosity-increasing polymer is a polyacrylamide.

7. Method of claim 1 preceded by injecting into the well a solution of scale-inhibiting composition.

8. Method of treating a subsurface oilfield formation penetrated by an oil producing well comprising (a) injecting into said well a scale-inhibiting solution of sodium amino tris methylene phosphonate, (b) injecting into said well a solution of a polyacrylamide, and thereafter (c) injecting into said well another scale-inhibiting solution of sodium amino tris methylene phosphonate.

9. Method of claim 8 in which the strength of the scale-inhibiting solution is at least about 0.5% by weight.

10. Method of claim 8 in which the polyacrylamide solution is at least about 0.05% by weight polyacrylamide.

References Cited

UNITED STATES PATENTS

| | | | |
|---|---|---|---|
| 2,341,500 | 2/1944 | Detling | 166—9 |
| 2,777,818 | 1/1957 | Gambill | 252—8.55 |
| 2,970,959 | 2/1961 | Jones | 252—8.55 |
| 3,308,885 | 3/1967 | Sandiford | 166—42 X |
| 3,336,221 | 8/1967 | Ralston | 252—8.55 X |
| 3,378,489 | 4/1968 | Lasater | 252—8.55 |
| 3,400,078 | 9/1968 | Jones | 252—8.55 X |

STEPHEN J. NOVOSAD, Primary Examiner

U.S. Cl. X.R.

166—310; 252—8.55